(No Model.) 2 Sheets—Sheet 1.
C. E. PATERSON.
PEA THRASHING MACHINE.
No. 526,869. Patented Oct. 2, 1894.
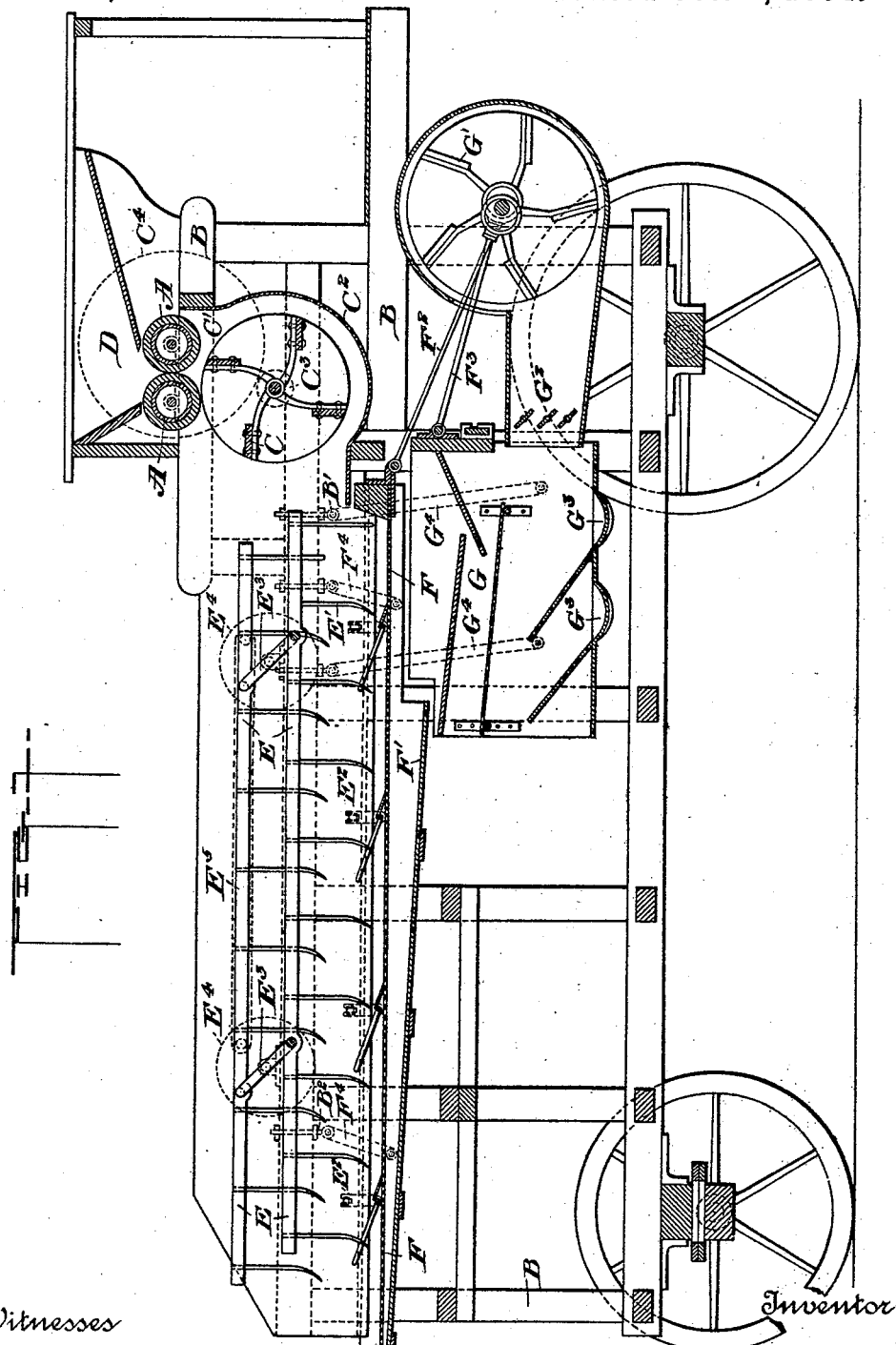
Witnesses
Gales P. Moore
W. H. Bentley
Inventor
Cecil E. Paterson,
By Geo. P. Whitney
Attorney

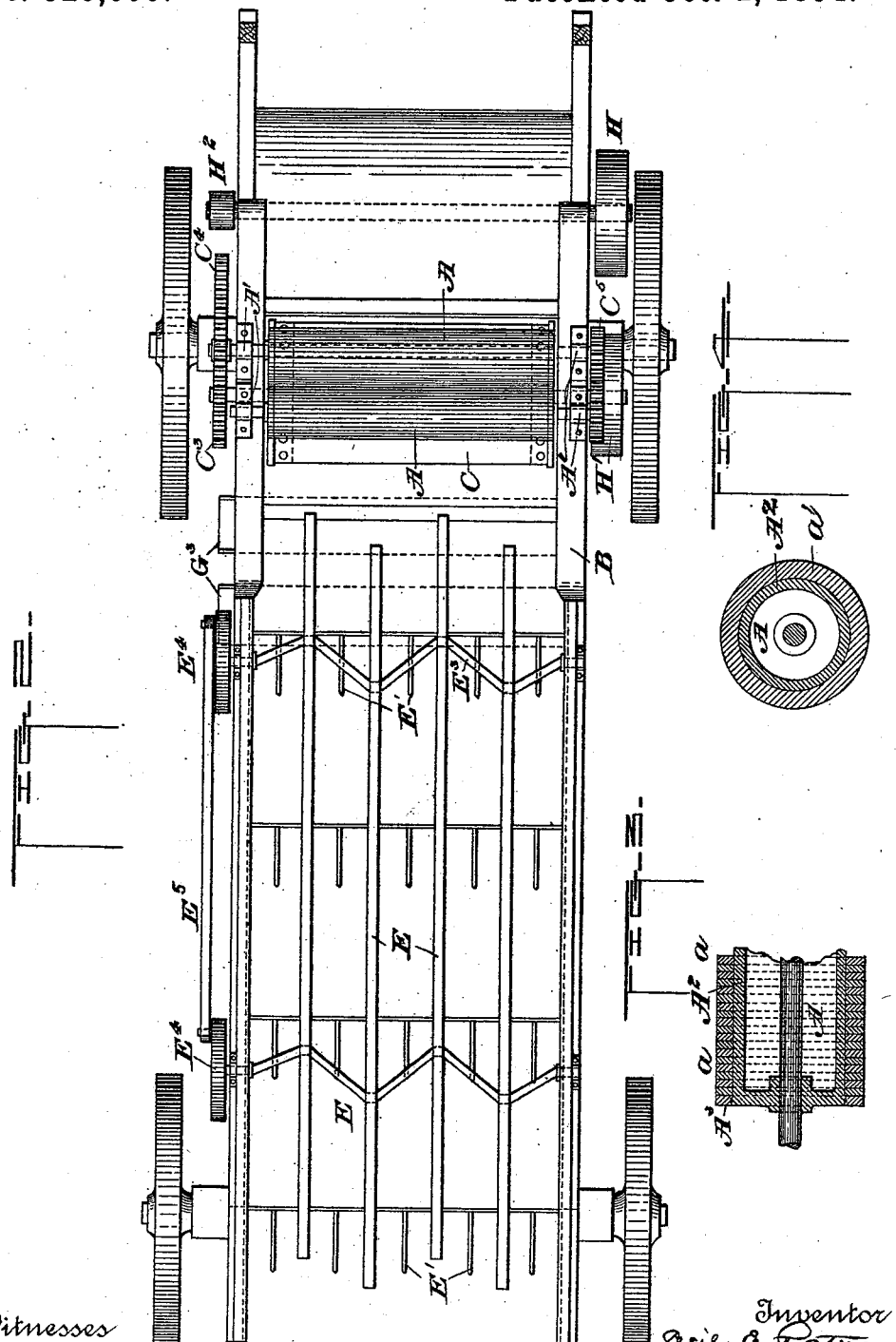

what
UNITED STATES PATENT OFFICE.

CECIL ELWIN PATERSON, OF TOORADIN, VICTORIA.

PEA-THRASHING MACHINE.

SPECIFICATION forming part of Letters Patent No. 526,869, dated October 2, 1894.

Application filed November 8, 1893. Serial No. 490,378. (No model.) Patented in Victoria January 25, 1893, No. 10,278.

*To all whom it may concern:*

Be it known that I, CECIL ELWIN PATERSON, grazier, a subject of the Queen of Great Britain and Ireland, and a resident of Tooradin, in the British Colony of Victoria, have invented certain new and useful Improvements in Pea-Thrashing Machines, (for which I have filed an application for patent of the Colony of Victoria, No. 10,278, bearing date January 25, 1893,) of which the following is a specification.

This invention of improvements in pea thrashing machines relates to the combination with such rolls of a rotary beater arranged beneath them and driven at a considerably higher velocity than the rolls the beater being supported centrally within a semi-cylindrical casing between which, and its extreme diameter is an annular throat or channel of sufficient width to allow the peas, pods and straw to be conveyed by the rotary action of the beater to the screen.

In a machine constructed with my improvements I employ screens, winnower and rakes of the types that usually form part of such machines and to which said parts I make no special claim and only describe them herein and illustrate them in the drawings in order to allow of my improvements and their location in the machine being well understood.

In the attached drawings:—Figure 1 is a longitudinal section through the center of a portable pea thrashing machine having my improvements embodied in it, and Fig. 2 a plan looking down on top of Fig. 1 with the feed hopper removed; Fig. 3., a longitudinal section, and Fig. 4. a transverse section through one of the rubber surfaced crushing rolls.

A A are the rubber surface or jacketed rolls the spindles of which are supported in bearings A' carried on the framing B of the machine. Fig. 3 shows the rubber surface formed by arranging on a metal drum $A^2$ closely fitting rubber rings $a$ that are held upon the drum by a screwed end washer $A^3$.

C is the beater or thrashing drum its spindle being supported in bearings borne by the framing B and arranged at the position shown.

C' is the semi-annular throat or passage way between beater C and the semi-cylindrical casing $C^2$.

D is the feed hopper leading to the rolls.

E are the rakes or conveyers for passing the straws, stalks and pods over the screen F, and underneath the latter is an inclined chute F' to lead the peas that pass through the screen backward to the riddles G which combined with the fan G' form the winnower.

$G^2$ are movable louvers in mouth of fan to regulate the current therefrom.

$G^3$ are the delivery chutes of riddle box.

$F^2$ is an eccentric rod worked by an eccentric on fan spindle and connected with screen F to impart to it a longitudinal shake.

$F^3$ is another eccentric rod also worked from an eccentric on fan spindle and connected with the riddle box to give it its necessary shake.

$G^4$ are swing bars supported by eye bolts B' from frame B and upon said bars $G^4$ the riddle box is hung.

The screen F is carried by swing bars $F^4$ hung from eye bolts $B^2$ secured to the frame of machine.

E' are tilt combs that rise and fall from a horizontal to an inclined position by reason of the end parts of the comb bars being secured to small levers $E^2$ the top ends of which are centered on studs secured to the side framing.

$E^3$ are the four throw crank shafts carrying the rakes E said cranks having disks $E^4$ at one end, the pins of which are connected together by a rod $E^5$ while motion is imparted to the disk nearest the rolls by a belt from a small pulley $H^2$ on end of fan spindle the other end of which carries a pulley H to which motion is imparted and to pulley H' on end of beater shaft by a belt from any suitable driving gear. The rubber rolls have motion imparted to them by a small spur pinion $C^3$ on end of beater shaft gearing with a spur wheel $C^4$ on end of one of the roller spindles while the other end of roller spindles have pinions $C^5$ on them that gear with one another.

The operation of the machine when set in motion by the gears just described is as follows: The unthrashed peas are fed to the hopper D which lead them to between the rolls A where the pods are crushed just sufficiently to crack or open them without splitting the peas, the pliable or springy nature of the rubber surfaces preventing the possibility of such occurring. Then as the unthrashed peas pass through the rolls they are thrashed by the beater C, and from thence they pass through channel or throat C' to the screen F, the peas falling through it and the rakes E carrying the stalks, &c., along the screen and over its farther end, the tilt combs in the meantime rising at regular intervals to prevent the return of same with the backward stroke of the rakes. The peas fall to chute F' leading to the riddles G where they are cleaned or winnowed and then pass into chutes $G^3$ leading to a bin at side of machine or to the bags.

Although my improvements are described as applied to a pea thrashing machine they may also be employed in machines for thrashing beans and other similar seed that have pods or shells.

Having now described my invention, what I claim as new, and desire to secure by Letters Patent, is—

In a pea thrashing machine, the combination with two rubber covered rolls, with their axes in the same horizontal plane, of a beater C driven at a higher rate of speed than said rolls with its axis below said rolls and between the vertical planes of their axes, and a casing $C^2$ concentric with said beater, and having between them a semi-annular channel C' for the passage of the vines and opened pods, said channel inclosing one side of the beater, substantially as described.

In witness whereof I have hereunto set my hand in presence of two witnesses.

CECIL ELWIN PATERSON.

Witnesses:
R. A. CROUCH,
BEDLINGTON BODYCOMB.